Figure 1:
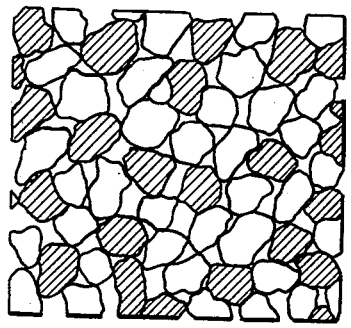

March 15, 1960 E. JUSTI ET AL 2,928,891
DOUBLE SKELETON CATALYST ELECTRODE
Filed Oct. 24, 1955

INVENTORS
EDUARD JUSTI, WOLFGANG SCHEIBE, AUGUST WINSEL
BY Burger, Dinklage & Sprung
ATTORNEYS i
United States Patent Office 2,928,891
Patented Mar. 15, 1960

2,928,891

DOUBLE SKELETON CATALYST ELECTRODE

Eduard Justi, Wolfgang Scheibe, and August Winsel, Braunschweig, Germany, assignors to Ruhrchemie Aktiengesellschaft, Oberhausen-Holten, Germany, and Steinkohlen - Elektrizität Aktiengesellschaft, Essen (Ruhr), Germany, both corporations of Germany Application October 24, 1955, Serial No. 542,434

Claims priority, application Germany October 23, 1954

12 Claims. (Cl. 136—86)

This invention relates to a double skeleton catalyst electrode.

Catalyst electrodes, such as gas-diffusion electrodes are known. These electrodes, combined with a second, equal or different electrode in a suitable liquid electrolyte, may form a fuel cell for the economical chemical generation of electric energy from combustible gases and an oxidizing agent, such as oxygen, air, or a halogen.

One of the most satisfactory gas-diffusion electrodes developed up to the present time is described by R. G. H. Watson in "Direct Current," volume 1, pages 30–34, 1952. This electrode was developed by F. T. Bacon and consists of a thin nickel layer with narrow pores deposited on a thicker nickel plate, having pores about twice as wide as the pores of the thin nickel layer. In operation, hydrogen is first passed through the wide pores with a loss of pressure of only about 10 mm. of mercury and displaces the electrolyte consisting of a potash solution from the wide pores. The hydrogen is then prevented by the fine pored nickel layer from escaping unused in the form of small bubbles. The fine pores offer a large surface area covered with a thin liquid layer to which a combustible gas may be passed by diffusion. The combustible gas is absorbed, probably with the formation of a metastable NiH compound, and is then displaced by the inflowing hydrogen and escapes in the form of H+ ions into the electrolyte, leaving behind one current-producing electron for each ion. In the electrolyte, the H+ ions combine with O−− ions coming from the oxygen diffusion electrode forming water.

In order that this fuel cell produces a sufficiently high current density, it must be operated at a temperature of as high as 200° C. At this high temperature, however, the vapor pressure of the potash solution of electrolyte increases to about 28 atmospheres per square centimeter, causing extremely difficult problems in connection with the fuel cell construction. A severe corrosion problem exists, as even the noble metals will not resist the hot concentrated solution. The nickel electrode as described thus only has a life period of a few hours, so that fuel cells equipped with such electrodes, in spite of the high current density of 330 milli-amperes per square centimeter at a service voltage of 0.79 volt and an efficiency of 60% are not able to supply electric energy cheaper than by the usual indirect way via heat engines.

The object of the present invention is an electrode which, in contrast to the electrodes mentioned above, is capable of ionizing hydrogen in the manner described at a temperature of as low as room temperature and of producing current densities of more than 100 milli-amperes per square centimeter. This electrode has a high mechanical strength and shows a high thermal and electric conductivity. Its resistance to poisoning is extremely high so that, after tests of more than one year, its life period is still out of sight.

The electrode of the invention consists of a structure with metallic conduction, the so-called "carrier skeleton," in the interspaces of which the catalytic substance proper, the so-called "catalyst skeleton," is likewise arranged in the manner of a skeleton. It is this structure from which the expression "double skeleton catalyst electrode" is derived.

Figure 2:
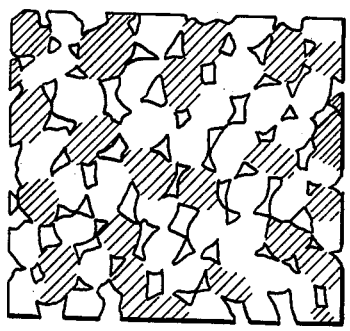
Figure 3:
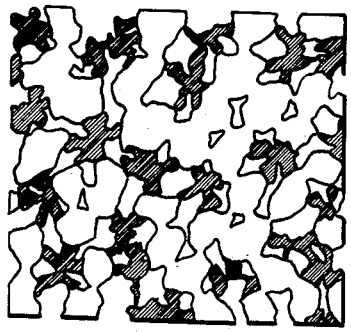

The production of the double skeleton may be illustrated in detail with the hydrogen double skeleton catalyst electrode being taken as an example. In this case, carbonyl nickel powder is used for forming the carrier skeleton and a pulverized nickel-aluminum alloy of a certain composition and referred to herein as nickel-Raney alloy is used for forming the catalyst skeleton. Both of the powders are intermixed as completely as possible. This mixture is now pressed to the shape desired. Fig. 1 shows diagrammatically a section of the electrode in this stage. The white particles shall represent the carrier skeleton substance and the shaded particles shall represent the grains of the nickel Raney alloy. By the pressing process, the particles have been pressed against each other. The electrode is now sintered at a certain temperature thereby fusing the particles together at the points of contact as diagrammatically shown by Fig. 2. The carrier skeleton is now finished and imparts the electrode the strength desired. Finally, the electrode is treated with an alkali solution which dissolves the aluminum more or less completely out of the nickel-Raney alloy but does not, or only to a very low extent, attack the nickel. After having dissolved out the aluminum, the highly active nickel-Raney catalyst remains back in the interspaces of the carrier skeleton nad forms the catalyst skeleton represented by the black areas in Fig. 3. At the same time, the porosity desired of the electrode is obtained.

Electrodes of this kind are particularly suited for use as diffusion electrodes in fuel cells to produce electric energy from gases or liquids with combustible constituents or mixtures of such gases or liquids on the one hand and oxygen or air and/or a halogen on the other hand.

Figure 4:
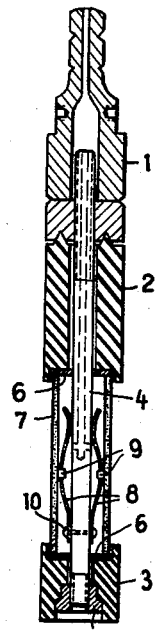

Especially as a hydrogen electrode, such double skeleton catalyst electrodes represent a substantial technical advance over the hitherto known constructions for high current densities of greater than 100 milli-amperes per square centimeter. Fig. 4 shows as example a hydrogen electrode having the form of a hollow cylinder in a holder constructed for test purposes. The double skeleton catalyst electrode 7 is fixed between the bottom member 3 and the intermediate member 2, both constructed of insulating material which is resistant to alkali solution, with the insertion of packing disks 6, by fastening the metallic tension pin 4 at the one end in the bottom member 3 by means of bottom screw 5 and at the other end by thread in the metalic terminal head 1 which presses against the intermediate member 2. Hydrogen gas enters the terminal head 1 through a longitudinal bore, is passed on through the hollow tension pin 4 and passes out through lateral openings on a level with the electrode 7. It can then diffuse from the inside through the electrode 7. The arrangement is immersed so far in the liquid electrolyte that the electrode 7 is wet over its whole length without allowing the electrolyte to touch the terminal head 1. If, in operation, hydrogen ions migrate from the electrode 7 into the electrolyte, negative charges remain on the electrode 7, which, via the contacts 9 and the contact springs 8 having conducting connection with the tension pin 4 by rivet 10, can be derived as current from the terminal head 1.

The novel double skeleton catalyst electrode, in the holder described as example, permits operation at low operating temperature and only slight superatmospheric gas pressure. In spite of the absence of noble metals, a high efficiency is obtained.

The novel electrode may easily be combined with oxygen electrodes already suggested to form an electrolytic gas cell. Examples of such electrodes which may be used as the oxygen electrode are carbon tubes which have an average pore diameter of 10–100 angstrom and an inner surface area of 10–50 square meters per gram, and which have been manufactured by heating to a temperature above 650° C. and subsequent sudden chilling to a temperature of below 50° C. with one or several repetitions of this procedure.

The electrodes in accordance with the invention have proven particularly well suited for use with alkaline electrolytes, for example, a 6-normal alkali solution being preferred.

Figure 5:
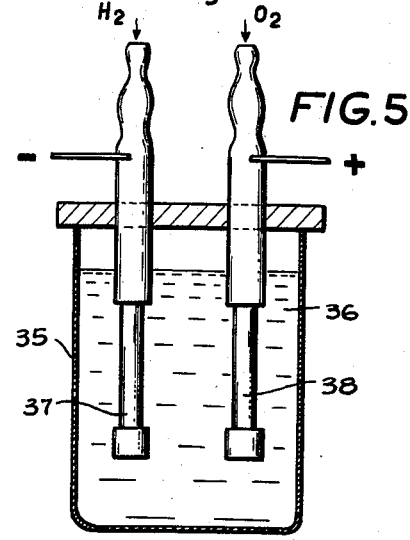

Fig. 5 shows by way of example the arrangement of an electrolytic gas cell. The cell case 11 contains the alkaline electrolyte 12 in which the novel double skeleton catalyst electrode 13 is immersed as the hydrogen electrode and the carbon electrode 14 described above is immersed as the oxygen electrode, both fixed in the holders described above. At the terminal heads of the two holders, current and voltage may be derived with the oxygen electrode being positively charged against the hydrogen electrode.

It is also possible to use liquids, such as pentane, to produce voltages and current against oxygen gas with favorable results when using the double skeleton catalyst electrode in accordance with the invention.

The double skeleton catalyst electrode in accordance with the invention may be produced by finely pulverizing the substance serving for the formation of the carrier skeleton and the Raney alloy forming the catalyst skeleton; completely intermixing the same and then pressing the same under high pressure of 3000–7000 atmospheres per square centimeter and preferably of about 5000 atmospheres per square centimeter. Following this, the mold is sintered at temperatures of about 500–1000° C. and finally treated with alkali lyes.

The term "Raney alloy" shall be understood to be any alloy which is composed of two or more components and the active component of which, after dissolving out of the inactive component, shows a catalytic effect. It is particularly advantageous, for the production of the novel hydrogen electrode to use a nickel-Raney alloy consisting of 20–60% by weight of nickel and 80–40% by weight of aluminum. Further inactive components which may be used besides aluminum are silicon, magnesium and zinc. Further active components which may be used besides nickel are, for example, cobalt and iron.

The substance used for forming the carrier skeleton should have a good electric conductivity of at least 100 [1/ohm/cm.] and also a sufficient thermal conductivity of at least 0.1 cal./cm. ° C. sec. and the electrical conductivity should be of metallic character. Moreover, the substance must form a sinterable mixture with the powder of the Raney alloy; should not be appreciably attacked by the alkali lye used for dissolving out the inactive component of the Raney alloy, and its position in the electro-chemical series should not deviate so far from that of the active component of the Raney alloy that it might be destroyed by the formation of local cells. It is particularly advantageous for the production of the novel hydrogen electrode to use nickel and especially carbonyl nickel. Examples of other materials which may be used instead of nickel are cobalt, iron and carbon and also alloys containing one or several of these components.

The comminution of the substances used is effected in such a manner that the Raney alloy is in the form of a powder having an average particle diameter of not more than 60 $\mu$ and the carrier substance is in the form of a powder having an average particle diameter of not more than 50 $\mu$.

The two powders are now completely intermixed. The mixture should contain 20–80% by weight and preferably 40–60% by weight of Raney powder in addition to 80–20% by weight and preferably 60–40% by weight of carrier skeleton powder. Thereafter, the mixture is pressed and sintered as set forth above.

For dissolving out the inactive component of the Raney powder there are preferably used potash solution and sodium hydroxide solution having about 1 to 10-normal concentrations.

*Example*

60% aluminum and 40% nickel were fused together in graphite crucibles at about 1400° C. and under a $CaCl_2$ protective melt to form a Raney alloy. The very brittle regulus was chipped off, crushed, and ground in a ball mill to a fine powder of 20–60 $\mu$ average particle diameter. This powder was mixed with nickel powder of about 5–15 $\mu$ particle diameter in a ratio of about 1:2 parts by volume. The mixture of powders obtained was pressed in dies into the shape desired using a stamp pressure of 3000–7000 atmospheres per square centimeter without the use of a protective gas atmosphere. The shaped body obtained was then sintered at about 700° C. for about 30 minutes in a reducing atmosphere. It has been found that the lower limit for the purpose desired is a sintering temperature of 600° C. with a sintering time of about 2 days, while the upper limit is at 950° C. with a sintering time of only 5 minutes. If these conditions are observed, the aluminum can be dissolved out with about 6-normal potash lye at 80° C. without inadmissibly reducing the mechanical strength, although the glowing of this shaped body in the air demonstrates its large active inner surface area, and although the pores formed allow the hydrogen to pass through with a low resistance to flow without allowing it to escape unused through the electrolyte in the form of small bubbles. The observance of the conditions of manufacturing mentioned above imparts the double skeleton diffusion electrode obtained the favorable properties mentioned including the electric conductivity which is at most 100 times lower than that obtained when using compact pure nickel, thereby making possible a very economical derivation of the generated current.

The highly active metallic double skeleton catalysts in accordance with the invention are not only suited for use as gas diffusion electrodes in a fuel cell, but may also be used as catalysts for other chemical processes. These catalysts are highly advantageous, due to their high thermal conductivity, which, in conjunction with their high mechanical stability, permits extremely easy removal of the heat of reaction.

The versatile applications can be supported by many examples from chemical process engineering. Thus, the use of the novel double skeleton catalyst electrode is of advantage in all chemical reactions in which Raney catalysts in powder form have hitherto been used, but in which the use of coherent catalyst bodies would be desirable for thermal or electrical reasons.

*Example I*

Hydrogenation reactions in the gaseous phase as, for example, the hydrogenation of carbon monoxide may successfully be carried out with the use of double skeleton catalyst electrodes by forcing the mixture of reaction gases under a pressure gradient through the electrode and adjusting the reaction temperature which is most favorable for the particular case. This adjustment of the reaction temperature is effected by the supply or removal of heat, which is easily possible due to the good thermal conductivity of the double skeleton catalyst electrode. Since it is possible to produce double skeleton catalyst electrodes of very uniform porosity, a uniform utilization of the whole active substance is assured.

Example II

In the electrolysis of $H_2O$-HDO-$D_2O$-mixtures, HDO enriches in the electrolyte at the double skeleton catalyst electrode which is connected as the cathode. The separation factor $$S = \frac{\left(\frac{D}{H}\right) \text{electrolyte}}{\left(\frac{D}{H}\right) \text{gas}}$$

describing the ratio of deuterium concentrations in the electrolyte and in the electrolytic gas is here nearly 20 as in the case of highly active noble metal electrodes (platinum or palladium). Since the double skeleton electrode has firstly a great surface area and represents secondly a reversible hydrogen electrode, the electrolysis at the same can be effected with a high current density as, for example, 2000 milli-amperes per square centimeter with only a low overvoltage which is about 200 milli-volts in this example. This considerably reduces the energy required for the production of heavy water as compared with other electrodes.

A further saving of energy is possible if the electrolytic hydrogen poor in deuterium is subsequently reversibly oxidized in fuel cells at double skeleton catalyst electrodes in accordance with the invention with the recovery of electrical energy.

Example III

At double skeleton catalyst electrodes, the D/H equilibrium between liquid and gaseous phase is obtained at a temperature of as low as room temperature because the double skeleton catalyst electrode in accordance with the invention operates as a reversible hydrogen electrode. If, for example, a double skeleton catalyst electrode is present as partition wall between a liquid space containing, for example, $H_2O$ and KOH and a gas space with a deuterium-rich mixture of $H_2$, HD and $D_2$, then a triphase boundary develops at a suitable gas pressure, at which the deuterium exchange between liquid and gaseous phase proceeds at a high rate.

While the invention has been described in detail with reference to certain specific embodiments, various changes and modifications will become apparent to the artisan which fall within the spirit of the invention and scope of the appended claims.

We claim:

1. Process for the production of catalyst bodies, which comprises pressing together a powdered material selected from the group consisting of carbon powder and metal powders capable of forming a sinterable mixture with powdered Raney alloy and being substantially resistant to lye with a powdered Raney alloy under a pressure between about 3,000–7,000 kg. per square centimeter, sintering the pressed mass at a temperature between about 600 and 1,000° C., contacting the sintered mass with lye to dissolve aluminum from the Raney alloy forming a Raney catalyst, and recovering the catalyst mass formed.

2. Process according to claim 1, in which the powders are pressed together in the form of a double skeleton catalyst electrode.

3. Process according to claim 2, in which the pressing together is effected with a pressure of about 5,000 kg. per square centimeter.

4. Process according to claim 1, in which said group member is a nickel powder, and in which said Raney alloy is a Raney nickel alloy.

5. A double-skeleton catalyst electrode for a chemical fuel cell, comprising a carrier skeleton in the form of a porous structure of a sintered powder selected from the group consisting of carbon and metal capable of forming a sinterable mixture with powdered Raney alloy, said structure containing distributed therein 20–80% by weight of Raney catalyst skeleton granules fused at points of contact to said group member.

6. Double-skeleton catalyst electrode according to claim 5, in which said Raney catalyst granules are Raney nickel catalyst granules.

7. Double-skeleton catalyst electrode according to claim 5, in which said group member is cobalt.

8. Double-skeleton catalyst electrode according to claim 7, in which said Raney catalyst granules are Raney nickel catalyst granules.

9. Double-skeleton catalyst electrode according to claim 5, in which said group member is iron.

10. Double-skeleton catalyst electrode according to claim 9, in which said Raney catalyst granules are Raney nickel catalyst granules.

11. Double-skeleton catalyst electrode according to claim 5, in which said group member is nickel.

12. Double-skeleton catalyst electrode according to claim 11, in which said Raney catalyst granules are Raney nickel catalyst granules.

References Cited in the file of this patent

UNITED STATES PATENTS

| | | |
|---|---|---|
| 1,915,473 | Raney | June 27, 1933 |
| 1,940,934 | Bennett et al. | Dec. 26, 1933 |
| 1,988,861 | Thorausch et al. | Jan. 22, 1935 |
| 2,250,421 | Riblett | July 22, 1941 |
| 2,276,188 | Greger | Mar. 10, 1942 |
| 2,699,458 | Schlecht et al. | Jan. 11, 1955 |
| 2,716,670 | Bacon | Aug. 30, 1955 |

OTHER REFERENCES

Direct Current, volume 1, No. 2, September 1952, pages 32–34.

Gardner, W.: "Chemical Synonyms and Trade Names, The Technical Press, Ltd., London, 1948, Ed. 5, pages 362 and 430.